United States Patent [19]

Moorehead et al.

[11] Patent Number: 5,494,589
[45] Date of Patent: Feb. 27, 1996

[54] METHOD OF MIXING GASES AND LIQUIDS EMPLOYING CONCENTRIC HELICAL FLOWPATHS

[76] Inventors: Jack F. Moorehead, 4120 Porte de Merano, No. 30; Michael Maung, 3275 Willard St., both of San Diego, Calif. 92122; Gabor L. Sonyey, 7295 Charmant Dr., No. 115, San Diego, Calif. 92111

[21] Appl. No.: 406,165

[22] Filed: Mar. 17, 1995

Related U.S. Application Data

[62] Division of Ser. No. 196,397, Feb. 15, 1994, Pat. No. 5,403,473.

[51] Int. Cl.⁶ ........................................... C02F 1/78
[52] U.S. Cl. ................. 210/760; 210/787; 210/788; 210/198.1; 210/205; 210/512.1; 261/79.2; 261/DIG. 42
[58] Field of Search ...................... 210/760, 787, 210/788, 198.1, 205, 512.1; 261/79.2, DIG. 42

[56] References Cited

U.S. PATENT DOCUMENTS

| | | | |
|---|---|---|---|
| 2,705,053 | 3/1955 | Morris | 210/512.1 |
| 2,738,070 | 3/1956 | Cottrell | 210/512.1 |
| 2,754,970 | 7/1956 | Ross | 210/512.1 |
| 4,343,707 | 8/1982 | Lucas | 210/512.1 |
| 4,569,759 | 2/1986 | Ben Aim et al. | 210/512.1 |
| 5,336,401 | 8/1994 | Tu | 261/123 |
| 5,403,473 | 4/1995 | Moorehead et al. | 210/95 |

*Primary Examiner*—Robert A. Dawson
*Assistant Examiner*—Robert James Popovics
*Attorney, Agent, or Firm*—John R. Duncan; Frank D. Gilliam; Donn K. Harms

[57] ABSTRACT

A generally columnar chamber for uniformly mixing a gas, such as ozone, into a liquid, such as water. The mixing chamber is assembled from a series of round tray sections each having an outer and an inner helical conduit sections and a central vertical tube section. The trays are stacked and secured together to form a continuous outer helix, inner helix and central column. A port at the bottom of the column directs liquid into the outer helical conduit spiraling up to the top of the column where a crossover port directs the liquid into the inner helical conduit downwardly to a cylindrical sump. The outlet of the inner helix into the sump is angled so as to create a vortex in the sump, forcing heavy particles outwardly to the sump wall. Heavy particles are allowed to migrate down the wall to a collection region at the bottom of the sump for later removal. The liquid from the sump passes upwardly through an aperture plate or vortex buster into the vertical column and finally out an outlet at the top of the column. The vortex in the sump forces gas bubbles to the center of the sump from which they are directed upwardly through the column, carrying buoyant particles and continuing the gas/liquid mixing.

6 Claims, 3 Drawing Sheets

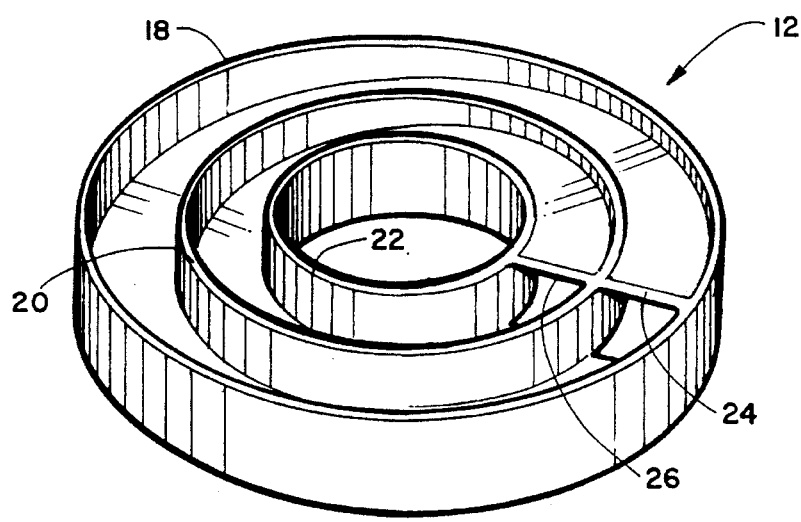
FIGURE 2
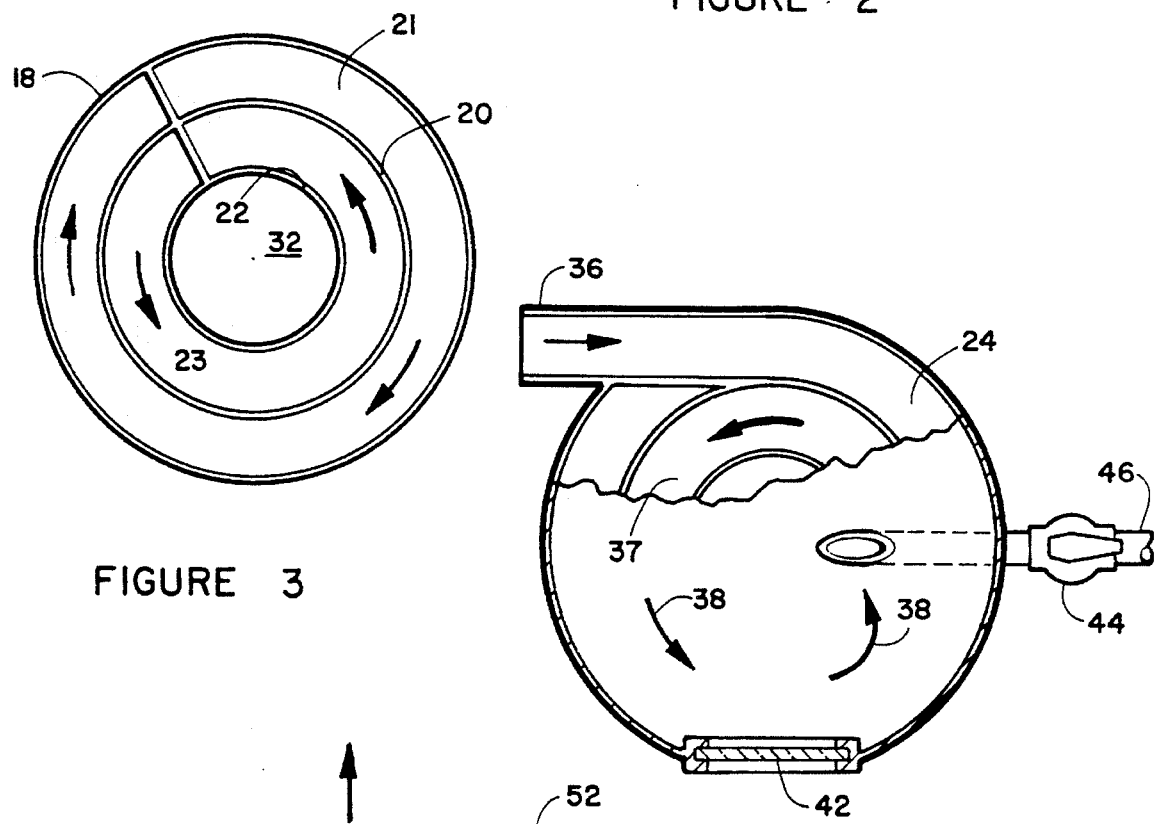
FIGURE 3
FIGURE 4
FIGURE 5

5,494,589

METHOD OF MIXING GASES AND LIQUIDS EMPLOYING CONCENTRIC HELICAL FLOWPATHS

This is a divisional of application Ser. No. 08/196,397 filed on Feb. 15, 1994, now U.S. Pat. No. 5,403,473.

BACKGROUND OF THE INVENTION

This invention relates in general to apparatus for mixing gases and liquids to dissolve the gas in the liquid and, more particularly, to apparatus for mixing ozone into water as part of a water purification system.

Ozone and mixtures of ozone and oxygen have long been mixed with water or other liquids to eliminate contaminants, in particular bacterial contaminants. Ozone is typically generated by exposing oxygen to a corona discharge unit. The ozone-oxygen gas mixture is then introduced into the liquid to be treated in the form of small bubbles. Typical contact and mixing chambers incorporate a venturi mixer or inductor port to inject ozone and oxygen (or, if desired, air in place of oxygen) into a fluid stream of water or other suitable liquid by venturi suction or high pressure injection.

In conventional ozone contact chambers, the ozone gas bubbles are injected at the base of a tall liquid column. The ozone-oxygen bubbles float to the surface slowly, their upward movement slowed by the downward counter flow of the liquid stream. To achieve sufficient contact time before the liquid passes from the mixing column, the column must be extremely tall and is difficult to install in ordinary sized plant equipment rooms. The concentration of dissolved ozone-oxygen is undesirably diluted in the larger vertical columns.

Ozone is also useful in water purification systems and the like to aid in removing small organic particles. Ozone causes a flocculating effect which improves the ability of a downstream filter to remove particles which would ordinarily pass through the filter. Highly uniform mixing of a carefully selected proportion of ozone is necessary, since an excess of ozone may break up organic particles, allowing the smaller particles to pass through the filter.

Thus, there is a continuing need for improved apparatus for more completely and uniformly mixing a gas, such as ozone, with a liquid, such as water, and for mixing the gas with the liquid in precise and controlled proportions of gas to liquid.

SUMMARY OF THE INVENTION

The above-noted problems, and others, are overcome by an apparatus for mixing a gas, such as ozone, with a liquid, such as water, which comprises a stacked series of round tray sections, each of which includes outer and inner helical sections and a central tube section so that the stack has continuous outer and inner helical conduits and a central column. A port at the bottom directs liquid into the outer helix, along which the liquid flows helically to the top of the column, where a crossover port directs the liquid into the inner helix so that the liquid flows helically downward to a generally cylindrical sump. The liquid stream exiting the inner helix is angled so as to create a rotating vortex in the sump, driving heavy entrained particles toward the outer walls and gas bubbles and buoyant particles toward the center of the sump. The heavy particles migrate downwardly to the bottom of the sump for periodic removal. The liquid from the sump passes through a vortex buster then upwardly through the central vertical column to an exit port at the top of the column.

The length of the column, with the turbulent liquid flow, assures maximum completeness and uniformity of gas/liquid mixing in the smallest possible space. Any gas bubbles and buoyant particles entrained with the gas bubbles pass out of the exit port with the liquid. The liquid can then go on to any desired further processing. Typically, the liquid can be further treated in a system of the sort described in my copending U.S. patent application Ser. No. 08/196,397, filed Feb. 15, 1994, now U.S. Pat. No. 5,403,473.

For optimum mixing, a suitably textured pattern can be used along the walls of the conduits to enhance turbulence in the liquid flowing therethrough. Randomly spaced surface irregularities, including spaced projections or depressions may be effectively utilized. I have found that a properly developed uniform turbulence in the slowing liquid reduces frictional drag and head loss in the system.

It is therefore an object of this invention to provide for the uniform mixing of relatively large proportions of a selected gas into a liquid. Another object is the uniform mixing of a gas into a liquid at a high rate in an apparatus of reduced size and complexity. A further object is to provide a gas/liquid mixing apparatus of improved simplicity and economy of manufacture. Yet another object is to provide a gas/liquid mixing apparatus that has the further feature of removing heavy particles from the liquid. Still another object is to provide a gas/liquid mixing apparatus that further enhances the flocculation of particles into larger particles and that carries buoyant particles to a downstream filtering station.

BRIEF DESCRIPTION OF THE DRAWING

Details of the invention, and of preferred embodiments thereof, will be further understood upon reference to the drawing, wherein:

FIG. 2 is a perspective view of one of the helically chambered trays making up the mixing apparatus;

FIG. 3 is a section view taken on line 3—3 in FIG. 1 showing ramp orientation;

FIG. 4 is a section view taken on line 4—4 in FIG. 1;

FIG. 5 is a detail section view of the vortex buster shown in FIG. 1;

DETAILED DESCRIPTION OF PREFERRED EMBODIMENTS

Figure 1:
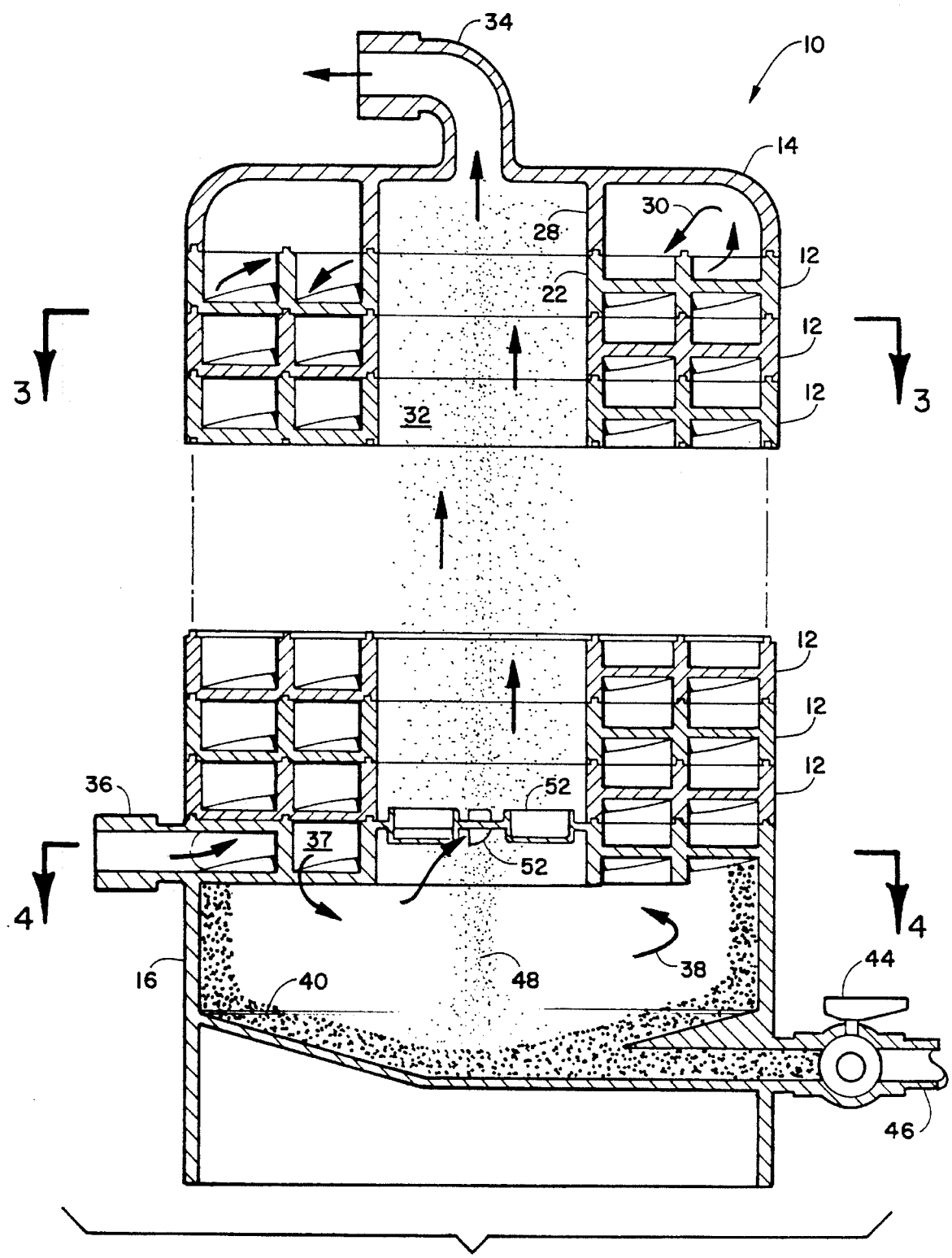
FIG. 1 is an axial section view through a gas/liquid mixing apparatus according to this invention.

Referring now to FIG. 1, there is seen a generally cylindrical chamber 10 which is made up of a plurality of stacked trays 12 of the sort shown in FIG. 2, with a cross over chamber 14 at the top and a sump 16 at the bottom.

Each tray 12, as best shown in FIG. 2, includes an outer tube section wall 18, an intermediate wall 20 and an inner wall 22, all preferably concentric. Helical ramp-like outer surface 24 is positioned between outer wall 18 and intermediate wall 20 while inner ramp surface 26 is positioned between intermediate wall 20 and inner wall 22. Each ramp surface 24 and 26 preferably extends about 360° around the tray center, although ramps having a greater or lesser extent could be used, if desired. While the use of helical ramps going around the center in the same, approximately parallel, circumferential direction, as shown, is preferred, if desired helical ramps sloping in opposite directions could be used, if desired.

When a plurality of trays 12 are stacked, the lower edge of the ramps on the upper tray are brought into contact with the upper edges of the ramps on the lower tray, forming a continuous helical conduit. Liquid moves upwardly along the outer helical conduit as indicated by arrow 21 and downwardly along the inner helical conduit as indicated by arrow 23 in FIG. 3. Of course, if desired the upward flow could be along the inner helical conduits and the downward flow along the outer helical conduits.

The stacked tray walls 18, 20 and 22 are bonded together, as are the abutting edges of ramps 24 and 26. Any suitable bonding method may be used. Typical bonding methods include adhesive bonding, welding, thermal or sonic sealing or a combination thereof. Trays 12 may be formed from any suitable material, such as plastics, metals, etc. For the optimum combination of ease of manufacture and assembly, lowest cost and efficient operation, injection molded plastics such as acrylics, acrylonitrile-butadiene-styrene, poly vinyl chloride and mixtures and combinations thereof are preferred. For maximum bonding area, ease of assembly and structural strength, the abutting surfaces should have tongue-and-groove joints or other interlocking joints.

Cross over chamber 14 has a lower outer wall that matches outer wall 18 on uppermost tray 12 and is bonded thereto. A central tube section 28 is coextensive with inner wall 22 of uppermost tray 12 and is bonded thereto. The remainder of the interior volume of cross-over chamber 14 is open, to permit liquid flowing up the outer helical conduit formed by ramps 24 to cross over and move down the inner helical conduit formed by ramps 26, as indicated by arrow 30. Liquid moving upwardly in central riser tube 32 formed by the inner walls 22 of the stacked trays exits through an exit port 34.

Sump 16 has an upper wall which is coextensive with, and bonded to, the lower edge of the lowermost tray 12 in the stack. As best seen in FIGS. 1 and 4, an inlet port directs liquid into the apparatus in communication with the lowermost outer ramp 24. Liquid coming down the inner helical conduit leaves the lowermost ramp end 37 in a direction which causes a rotating vortex of liquid in sump 16, as indicated by arrows 38. The vortex forces cause heavy particles 40 to move to the outer wall of sump 16, then to migrate to the bottom of the sump under gravity forces. A glass viewing port 42 allows the accumulation of particles to be observed an also can be easily removed to serve as a clean-out port. When a suitable quantity of particles 40 have accumulated, a waste valve 44 is opened and particles 40 with a small amount of liquid are drained to waste line 46. This clean-out can be accomplished manually or automatically in response to a sensed accumulation of particles using conventional sensors and actuators.

As seen in FIG. 1, bubbles and buoyant particles 48 are forced to the center of the vortex in sump 16. These bubbles and particles (caused to flocculate by the ozone, forming larger masses of particles) pass up through vortex buster 50 into central riser tube 32 and eventually out outlet port 34.

These flocculated buoyant particles can be easily removed by filtration at a conventional downstream station (not shown).

Figure 6:
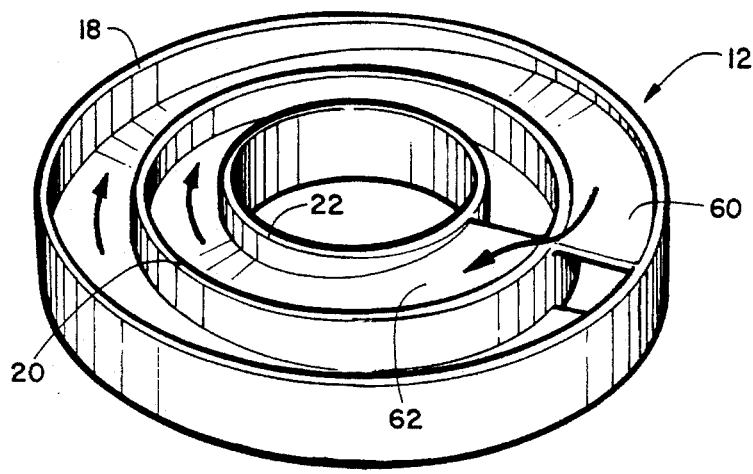
FIG. 6 is a perspective view similar to FIG. 3 showing an alternate embodiment of the ramp orientation

Since a vortex is undesirable in central riser tube 32, a vortex buster plate 50, (as seen in FIGS. 5 and 6) having a plurality of louver-like turning vanes 52 receives rotating liquid from sump 16 and turns it to flow straight up central riser tube 32. Each vane 52 receives liquid from a slack region out of the vortex stream and directs it upwardly. While any suitable number of turning vanes 52 may be used, in general four are preferred, evenly spaced around the chamber axis, with opposite pairs extending most of the distance across tube 32.

FIG. 6 is a perspective view of a tray 12 having an outer wall 18, an intermediate wall 20 and in inner wall 22 as described above. In this embodiment, outer ramp 60 and inner ramp 62 form upward and downward helical conduits running in opposite directions, respectively, that cause water going up and down to move in the same circumferential direction around the center of the column. This provides a smoother, less turbulent, transition in crossover chamber 14.

Figure 7:
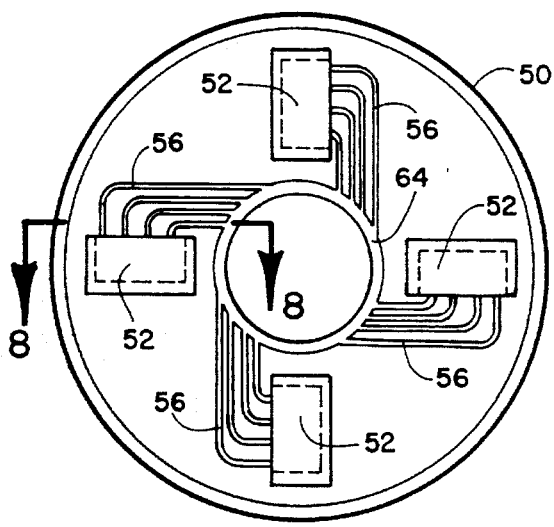
FIG. 7 is a horizontal view looking upwardly at the embodiment of the vortex buster on line 7—7 in FIG. 5.
Figure 8:
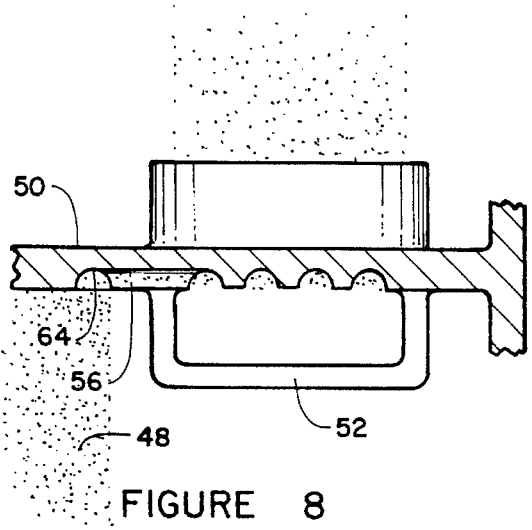
FIG. 8 is a detail section view taken on line 8—8 in FIG. 6.

An alternate embodiment of vortex buster plate 50 is shown in FIGS. 7 and 8. FIG. 7 shows a vortex buster basically of the sort shown in FIG. 5, looking upwardly at the underside. With the vortex buster as shown in FIGS. 1 and 5, a column of bubbles 48 forms at the center of the vortex in sump 16. As the column grows wider as more bubbles accumulate, eventually the bubble column diameter extends to the inner edge of turning vanes 52 and spill through the slot and move up through the central column. In some cases it is desirable to increase the flow of bubbles even where the diameter of the column does not extend to the turning vanes. As seen in FIGS. 7 and 8, a circular groove 64 is provided at the desired bubble column diameter. A plurality of generally radial grooves 56 extend from circular groove 64 to the openings of turning vanes 52. Once the bubble column diameter reaches circular groove 64, buoyancy will move bubbles into the groove and vortex forces caused by the rotating bubble and water column will cause the bubbles to move outwardly through grooves 66 to the turning vane openings. This arrangement will spread out the pattern of bubbles moving upwardly through the turning vane openings. Thus, the bubbles will be greatly scattered, will be less likely to form fewer larger bubbles and will entrain more small buoyant particles and carry them to a solids separator or the like downstream of this apparatus.

Figure 9:
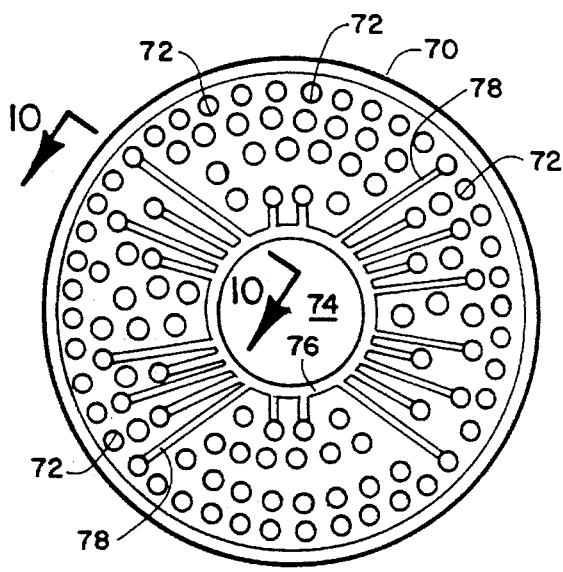
FIG. 9 is a horizontal view looking upwardly at a second embodiment of the vortex buster.
Figure 10:
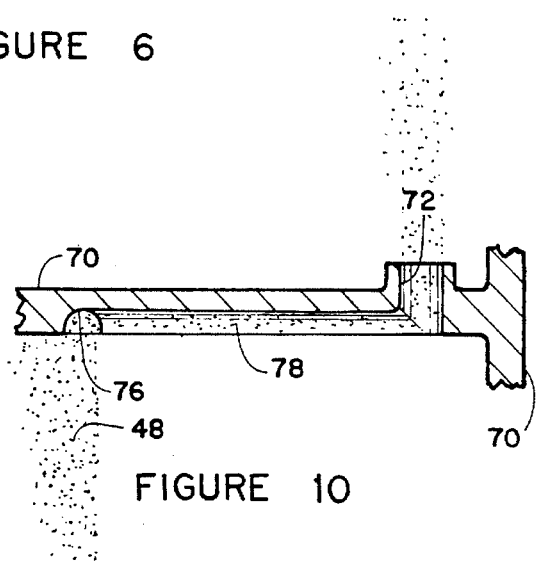
FIG. 10 is a detail section view taken on line 10—10 in FIG. 9.

If desired, a diverter plate 70 as shown in FIGS. 9 and 10 may be used in place of the vortex busters of FIGS. 5, 7 and 8. Here, plate 70 closes the lower end of central channel 32. A large number of perforations 72 are spread across the plate surface outside a central circular area 74. Perforations 72 may be simple holes through the plate, or may have a raised collar on the upper surface, as seen in FIG. 10. A circular groove 76 is formed in the lower surface of plate 70, similar to groove 64 in FIG. 8. A plurality of radial grooves 78 communicate between circular groove 76 and some of perforations 72. The top of bubble column 48 as seen in FIG. 1 will lie against the central area of plate 70. When the diameter of the rotating column of bubbles 48 expands to the point where bubbles enter circular groove 76, vortex forces will cause them to travel along radial grooves 78 and up through holes 72 at the ends of the grooves. If the bubble column continues to expand, eventually the bubble column will cover other holes 72 so that additional bubbles will pass through and up the central column 32 (shown in FIG. 1). Thus, bubbles will be spread out across central column 32.

While certain preferred materials, dimensions and arrangements have been detailed in conjunction with the above description of preferred embodiments, those can be varied, where suitable, with similar results.

As mentioned above, it is desirable to remove the suspended solids collect in the sump and avoid passing solid particles through the gas-liquid mixer of this invention to downstream equipment, such as filter systems and the like. Accumulation of solids in the sump can be monitored visually through port 42. If desired, an automatic sensing system may be used to monitor the level of suspended solids collecting in the sump area. Such sensing systems include acoustical wave controller-monitors which measure a refractive or reflective wave, indicating the density of particles moving past the sensor. The signal is compared, such as by a computer system, to determine when to drain particles away through outlet 46. Also, a small venturi tube mounted in the sump through which the liquid flowing in the vortex passes may be used to measure the difference in pressure drop as fluid in the sump passes through the venturi. As viscosity increases with increased suspended solids concentration, a decreasing vacuum measurement at the venturi throat will indicate the degree of accumulated solids.

In a preferred embodiment, the gas and liquid being mixed are ozone and water in a water treatment facility. A conventional ozone generator may be controlled by a variable variac to increase or decrease the output of the ozone generator. Typically, the ozone is generated from oxygen by a high voltage corona discharge unit. The ozone output can be controlled by altering the voltage of the current flowing to the ozone generator with a solid-state AC voltage regulator, with a multi-tap transformer controlled by electronic gates in a computer system or with a fixed voltage step-up transformer including a variable control signal generating computer chip which alters the frequency of the current as well as the voltage. The voltage output of a veriac controller may also be slowly adjusted by a piezo activated variable transformer.

Other applications, variations and ramifications of this invention will occur to those skilled in the art upon reading this disclosure. Those are intended to be included within the scope of this invention as defined in the appended claims.

We claim:

1. The method of mixing a gas with a liquid which comprises the steps of;
    forming first and second spaced substantially concentric helical paths surrounding a central tube;
    directing a mixture of gas and liquid into an entrance at the lower end of said first helical path;
    transferring said mixture into said second helical path at the upper ends of said helixes;
    directing liquid exiting the lower end of said second helical path into said central tube in a upward direction;
    whereby said gas is intimately mixed with, and dissolved into, said liquid.

2. The method according to claim 1 wherein said liquid exiting said second helical path is directed into a sump upstream of said central tube in a manner creating a rotating liquid vortex in said sump whereby heavy particles are forced to the outer wall of said sump and collected at the bottom of said sump.

3. The method according to claim 2 including a further step of removing said heavy particles and a quantity of liquid from said sump.

4. The method according to claim 3 further including the step of straightening the liquid flow entering said central tube.

5. The method according to claim 4 further including the step of dispersing bubbles accumulated at the center of said vortex into and across the column of liquid in said central tube.

6. The method according to claim 1 wherein said gas comprises ozone and said liquid comprises water.

* * * * *